Oct. 8, 1963   C. A. DE GIERS ETAL   3,106,694
ELECTRIC LIQUID LEVEL INDICATOR
Filed June 14, 1962
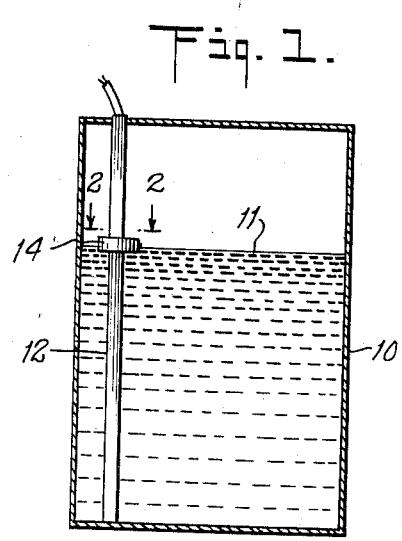
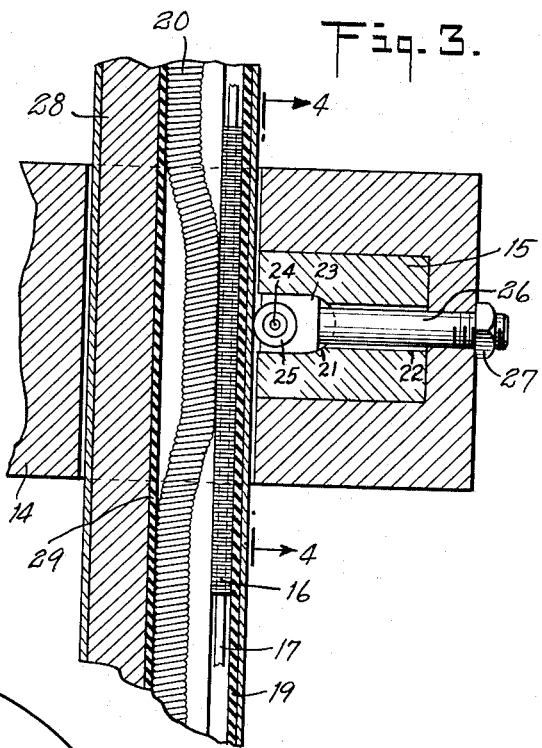
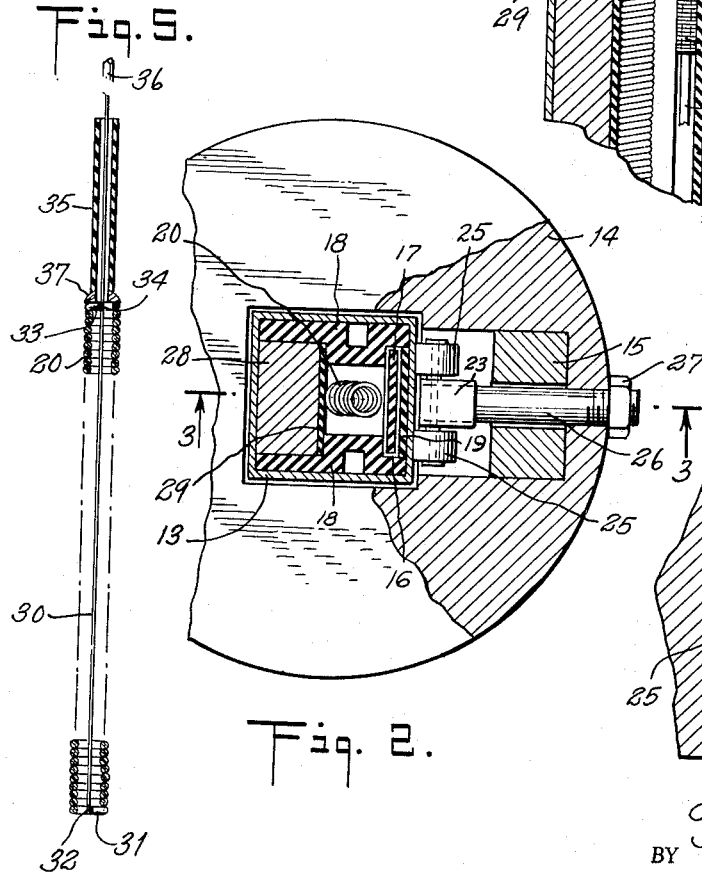
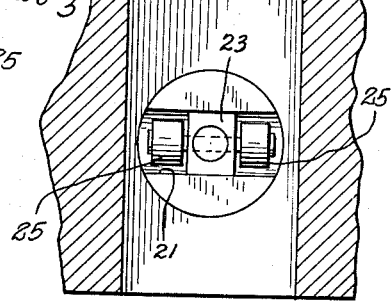
INVENTORS
Clarence A. de Giers
Joseph Marinelli
BY
Paul M. Phillips
ATTORNEY

United States Patent Office 3,106,694
Patented Oct. 8, 1963

3,106,694
ELECTRIC LIQUID LEVEL INDICATOR
Clarence A. de Giers, Brookville, and Joseph Marinelli, Rockville Center, N.Y., assignors to The Liquidometer Corp., Long Island City, N. Y., a corporation of Delaware
Filed June 14, 1962, Ser. No. 202,455
9 Claims. (Cl. 338—33)

The present invention relates to position-responsive means and particularly to a means for translating the instantaneous position of a member, which is movable in a predetermined path, into an electrical output signal, the value of which is proportional to such instantaneous position. One example of such a means is a liquid-level responsive means, wherein a float or other mechanical level-responsive means is arranged to move a member in a predetermined path. This member in turn may be used to move a primary or first permanent magnet along a path adjacent to and substantially parallel with a magnetically-sensitive means which controls the value of the electrical output of the device.

While the device of the present invention is peculiarly adapted and will be described hereinafter as applied to a means for translating liquid level into an electrical value or output signal, the value of which is proportional to such level, the invention is not limited to this particular use, but includes the translation of any mechanical movement of a member, the position of which it is desired to indicate at a distance, by translating it into such an electrical value. This electrical value or output signal may then be used to control known type equipment which may be positioned at a distance and which is capable of indicating the position of the member in question or of taking any other action responsive to such member being or attaining a given position.

As such, the device is an improvement upon the invention of a prior patent to De Giers, one on the present inventors, No. 2,484,690, granted October 11, 1949, wherein a plurality of flexibile reeds are provided which may be selectively drawn into contact with an elongate resistor by a magnet which is vertically moved outside a shield surrounding the resistor and the reeds, the magnet preferably being carried by a float. An electrical system by which the division of electrical resistance, as determined by the float control, is translated into an indication of liquid level is shown in the De Giers patent aforesaid. Other systems, one of which is in some respects similar thereto, for translating electrical resistance into an indication of liquid level, are disclosed in a pending application of said De Giers, Serial No. 139,206, filed September 19, 1961.

In both the systems aforesaid the contact with a resistor was made by flexible means, e.g. by a plurality of reeds, which were drawn into contact with the resistor by magnetic force exerted in a manner so that there would be no relative frictional movement between the flexible means (the reeds) and the resistor. The present invention includes this advantageous relationship and thus partakes of the advantages of the two earlier De Giers inventions in that there is no rapid wearing of the resistor such as would be occasioned by the friction of a rheostat or potentiometer slider moving back and forth in contact with the resistance coil. Such frictional wear might be occasioned, for example, if the device were to be used in a fuel tank in a ship where the motion of the ship caused some more or less continuous variations of the liquid level and hence more or less continuous rubbing motions of a potentiometer or rheostat slider. Such rubbing motion in practice has been found to cause rapid wear and sometimes even failure of the wire of the resistance coil which is subjected to this rubbing.

The present invention distinguishes from the two earlier inventions aforesaid particularly in that there is provided what may be termed a return magnet, which causes the magnetically sensitive movable means, which are actuated by a principal magnet moved by the float, to move out of contact with the resistor once the float-moved principal magnet is out of its closest proximity to any given portion of the movable means respectively. This provides a more positive and truer function of the liquid level-responsive means than was provided by the devices of the earlier De Giers inventions which depended upon the mechanical resiliency of the reeds for return or retractive action of the several reeds respectively.

The present invention also embodies a form of the invention of the De Giers copending application, Serial No. 202,424, filed June 14, 1962, which discloses and claims a combination including a return or retractive magnet as aforesaid. As between these two cases, all subject matter which is common to both cases is claimed in said De Giers copending application Serial No. 202,424; while subject matter peculiar to the present case and not disclosed in the De Giers copending application Serial No. 202,424, is claimed herein.

The present invention is thus restricted to the presence and use of a movable member; portions of which are brought into contact with the resistance coil in accordance with the liquid level, wherein the movable member is a single flexible member, extending lengthwise with respect to the long dimension of the resistance coil. It will be understood that while certain preferred forms of the invention which are hereinafter illustrated and described in detail are those in which both the resistance coil and the flexible member and the return magnet are disposed substantially vertically in a container for the liquid, this arrangement is only one possible arrangement embodying the invention, which is broad enough to include a disposition of these elements, i.e. the resistance coil, and all parts extending therealong to be disposed in a straight line and at an angle other than the vertical with respect to the container in which it is located and further, it is broad enough to include the possibility of these parts being disposed in some arcuate or curved path, so long as means are provided whereby the principal magnet is movable in a path substantially parallel to the disposition of the resistance coil. Such a path may, for example, be arcuate as a part of a circle, as disclosed particularly in the De Giers copending application Serial No. 139,206 aforesaid.

In a preferred form of the present invention the movable member, portions of which are moved selectively into contact with the resistance coil, is formed as a helical coil or wire spring arrangement, and preferably one in which the several coils of the helix are so close together as to be substantially in contact with one another. It is found that under these circumstances, only that portion of this flexible member which is substantially opposite the principal magnet will be drawn into contact with the resistance coil; while other portions thereof will be drawn out of contact with the resistance coil or will be maintained out of such contact by the return magnet as hereinafter set out.

Further objects and advantages of the present invention will become apparent from the following detailed description of a preferred embodiment thereof, which is also illustrated in the accompanying drawings, in which:

FIG. 1 is a diagrammatic view substantially in vertical section showing a container for a liquid and provided with a liquid-level responsive device in accordance with the present invention;

FIG. 2 is a view in horizontal cross-section and with parts broken away illustrating the construction and operation of the device, the view being taken in part on the line 2—2 of FIG. 1 and in part on a somewhat lower level and being on a substantially enlarged scale;

FIG. 3 is a fragmentary view substantially in vertical section on the line 3—3 of FIG. 2;

FIG. 4 is a fragmentary view with parts in vertical section and other parts in elevation, the view being taken substantially on the line 4—4 of FIG. 3; and FIG. 5 is a fragmentary view, partly in elevation and partly in vertical section, showing an alternative construction for the flexible movable member of the device.

Referring particularly to FIG. 1 of the accompanying drawings, the device of the present invention is intended for sensing the level of liquid in a container. Such a container is shown, for example, at 10 and contains liquid up to level 11 in the view shown. Extending preferably vertically through the container is a device generally indicated at 12 which is shown in FIG. 1 solely as the outside of a hollow column 13 which is substantially square in cross-section, best seen in FIG. 2. This device constitutes the shielding means of the present invention which is preferably but not necessarily used to contain certain other parts hereinafter described and to prevent contact therewith of any liquid which may be in the container 10. The shielding means, when used, is preferably formed of a suitable non-magnetic material such as aluminum or brass, but in any event should be of a material which will be chemically neutral with respect to the liquid in the container 10. Surrounding the shielding means 13 and arranged in sliding contact therewith, preferably with a minimum of friction, is a float device 14 which may be of cork or the like, but in any event which is constructed so as to have a substantially lower bulk density than the liquid in the container. This device carries a first permanent magnet 15 as hereinafter described in greater detail.

Within the shielding means 13 is a resistance coil or resistor 16, which is wound upon a suitable strip 17 of appropriate insulating material in a conventional manner, the resistance coil or resistor 16 being vertically disposed with respect to the container 10 in the form shown in the drawings. Also as shown, the resistor or resistance coil 16 is positioned in the shielding means 13 by a pair of longitudinally extending insulating members 18. The resistor is prevented from electrical contact with the right-hand side, as seen in FIG. 2, of the shielding means 13 by a strip 19 also of suitable insulating material. All the means which are located as shown and herein described within the shielding means 13 are maintained thereby out of contact with any liquid which may be in the container 10.

Also extending in this case vertically within the shielding means and in any event substantially parallel to the longitudinal extent of the resistor 16 is a movable member 20 which is preferably in the form of a tight helical coil of electrically conducting metallic wire, with each turn substantially in contact with the next or contiguous turn. Such a member has great flexibility, so as to permit a portion thereof being deflected as shown in the center portion of FIG. 3 and also in FIG. 2 at the point where the section in FIG. 2 is taken, all without undue strain or the requirement of the application of excessive force. The material of which the coil or movable member 20 is formed is of iron, steel or other magnetically sensitive material, so that when the magnet 15 is opposite a portion of the movable member 20, that portion will be drawn to the right as seen in FIGS. 2 and 3 into contact with the resistor 16. Inasmuch as the member 20 is highly flexible, and by reason of the return magnet hereinafter to be described in detail, only that portion which is in closest proximity to the magnet 15 will be so drawn into contact with the resistor.

While the first permanent magnet 15 may be of any desired form, that shown is substantially cylindrical, with a substantially horizontal slot 21 formed on its inner end and disposed transversely and with a hole 22 formed therein. In the slot 21 is disposed a center block 23 carrying a transverse shaft 24 on which is mounted a pair of rollers 25, these rollers acting to bear against the outside of one of the plane surfaces of the shielding means or hollow column 13. The block 23 further has secured thereto a bolt 26 extending through the hole 22 and through the side of the float 14 and having threaded thereon outside the float a suitable nut 27 securing all the parts in the position shown.

It will be understood that while the particular construction of magnet and the mounting of the antifriction rollers 25 has been described, other constructions equivalent in their general purpose and result could be substituted without departing from the spirit of the invention.

There is also provided within the shielding means 13 and specifically located by the insulating members 18 a longitudinally extending second permanent magnet means 28. This means 28 is magnetized transversely, so as to exert a magnetic attraction at all times upon all parts of the movable member 20. However, while this magnetic pull is equally applicable to all parts of this member, it is of a substantially lesser value than the magnetic pull exerted by the first permanent magnet 15 as to that portion of the movable member 20 which is immediately opposite the magnet 15. As a result, therefore, the movable member 20 will be caused to assume the form generally shown in FIG. 3 at a point opposite the position of the permanent magnet 15.

The shielding means 13 is usually desired as aforesaid, so as to prevent contact between any liquid which may be in the container 10 and the resistor 16, the movable or flexible member 20 and the return magnet or second permanent magnet means 28, all as hereinabove described and which are shown in the drawings, FIGS. 2 and 3, as within the shielding means. This serves not only to prevent shorting of the resistor in the event that an electrically conductive liquid is being measured, but also serves to prevent the accumulation of dirt and liquid residues on the electrical parts. There are instances, however, as where a clean hydrocarbon liquid such as gasoline is being measured, where direct contact between the liquid and the resistor and/or other electrically connected parts is not harmful. In such cases, the shielding means 13 may be wholly omitted as it is not per se essential to the present invention.

The movable member 20 is prevented from actual contact with the second or return magnet 28 by a strip of insulating material 29 as shown and which is also positioned by the insulating members 18. As the magnet 15 moves from one end to the other of its path of movement, the several portions of the member 20 will be progressively and uninterruptedly drawn to and away from the electrical contact with the resistor 16 by a progressive, rather than by a step-by-step movement.

The flexible member 20 is suitably secured in a manner not herein specifically illustrated at its upper end as seen in FIG. 3 to a part of the device which is suitably insulated from the resistance coil 16 and which may serve as an electrical connection to this flexible member. The lower end of the member 20 may be wholly unattached to adjacent parts so as to be free to move under the influence of the magnets affecting its position, i.e. to move between a position adjacent to the permanent magnet 28 on the one hand, in which it is separated therefrom solely by the insulating material 29, and a position wherein a portion of the movable or flexible member 20 is in actual contact with the resistance coil 16. As best shown in FIG. 2, this is but a relatively restricted lateral movement. When the device as a whole is in a substantially vertical position as shown in FIG. 1, the movement of the member 20 will be unaffected by gravity and movement toward and away from its operative position in contact with the resistor 16 will be a lateral movement.

Electrical connection is made with the member 20 on the one hand and with one or both ends of the resistor or resistance coil 16 on the other, depending upon whether the device is to be used as a rheostat or as a potentiometer. The electrical connections may be essentially those set out in the De Giers patent aforesaid or in the De Giers copending application Serial No. 139,206 or other equivalent use. Any suitable type of liquid level control and/or indicating systems, of which several are described in the prior inventions herein referred to, may be used in connection with the apparatus of the present invention.

There is shown in FIG. 5 a modification of the form of the invention and particularly of the construction of the flexible member 20 which is illustrated in FIGS. 2 and 3. In the form of FIG. 5 this member is also constructed generally as a helical wire coil with the turns of the coil close together. In order, however, to prevent the elongation or sagging of the coil under the influence of gravity or otherwise, which might tend to cause sluggish or uncertain operation under some conditions, it may be desired to provide a central wire 30 such as a stainless steel wire preferably of about 0.008 inch diameter, which is suitably secured to both ends of the coil 20. This may be effected at the bottom of the coil 20 as by bending inwardly the end of a lower turn of the coil at 31 and securing it to the wire 30 by solder 32 or the like. Similarly, the upper turn of the coil may be bent inwardly at 33 and secured as at 34 to the wire 30 by solder or the like. Preferably the wire 30 is extended further upwardly as shown and extends through a suitable insulating sleeve 35, and is suitably secured as at 36 to some rigid and suitably insulated portion of the apparatus in a manner also not specifically illustrated and which apparatus portion may also serve as the electrical terminal for the wire 30 and for the coil 20 in this form of the invention. As shown, a suitable fitting 37, insulating or otherwise, may be provided between the upper end of the coil at 20 and the lower end of the insulating sleeve 35. In general, the effect of this construction is to provide a means for preventing the sagging of the turns of the coil 20 under the influence of gravity or otherwise which might in some way interfere with the free movement of selected portions of the coil between their operative and inoperative positions in the manner hereinabove described.

While there has been shown and described herein but one physical embodiment of the present invention, the intended scope thereof and equivalents of the means particularly illustrated and specifically described have been pointed out as the description has proceeded. Other equivalents and alternatives will occur to those skilled in the art from the foregoing particular disclosure. We do not wish to be limited, therefore, except by the scope of the appended claims, which are to be construed validly as broadly as the state of the art permits.

What is claimed is:

1. A liquid level-responsive means for selectively making electrical contact with a resistor at a position proportional to the level of the liquid in a container, comprising a float mounted for movement in a predetermined path so as to be afloat on the surface of the liquid in said container;

an elongate electrical resistor disposed in said container in a predetermined extended position, an elongate, magnetically-sensitive member extending generally parallel to said elongate resistor, said member being flexible so that different portions thereof may be selectively brought into contact with said resistor at points therealong which are respectively opposite said different portions;

first permanent magnet means positioned by said float and arranged to be moved thereby in a path which is substantially parallel to the long dimension of said resistor and in magnetic proximity with said flexible member, for selectively causing that portion of said flexible member which is in magnetic proximity therewith to move into contact with said resistor;

and a second permanent magnet means which is separate and distinct from said first permanent magnet means and extends generally parallel to said resistor and is in magnetic proximity with said flexible member substantially throughout its length, said second permanent magnet means having a lesser attraction for said flexible member than said first permanent magnet means when the latter is in its closest proximity to a particular portion of said flexible member, so as to move the latter into contact with said resistor; but said second permanent magent means being effective to hold those portions of said flexible member which are out of said closest proximity to said first permanent magnet means away from electrical contact with said resistor and to retract all portions of said flexible member away from contact with said resistor which are out of said closest magnetic proximity with said first permanent magnet means.

2. A liquid level-responsive means in accordance with claim 1, in which a shielding means is provided which completely encloses said resistor, said flexible member and said second permanent magnet means, and prevents any contact therewith of any liquid which may be in said container.

3. A liquid level-responsive means in accordance with claim 1, in which the part of said flexible member which engages said resistor is varied progressively and uninterruptedly from one end of said flexible member to the other as said first permanent magnet means moves from one end to the other of its path of movement; and all parts of said flexible member other than that portion opposite said first permanent magnet means are kept out of contact with said resistor by said second permanent magnet means.

4. A liquid level-responsive means in accordance with claim 2, in which said shielding means and all the means therein including said resistor, said flexible member and said second permanent magnet means, are all disposed in a substantially vertical position in said container;

and in which said first permanent magnet means is carried directly by a substantially annular float which encircles said shielding means and is effective to move said first permanent magnet means up and down as the level of liquid in said container rises and falls respectively.

5. A liquid level-responsive means in accordance with claim 1, in which said flexible member is formed as a helical wire coil.

6. A liquid level-responsive means in accordance with claim 5, in which said helical wire coil forming said flexible member is made up of turns which are normally of such pitch that they are substantially in engagement with one another throughout the length of said flexible member.

7. A liquid level-responsive means in accordance with claim 5, in which the lower end of said helical wire coil is unattached to other adjacent parts of the device, so as to be freely movable between a position adjacent to said second permanent magnet means and a position in contact with a portion of said resistor.

8. A liquid level-responsive means in accordance with claim 5, in which a wire extends lengthwise through said helical wire coil and is secured to each end of said coil at spaced points along said wire, so as to prevent the turns of said coil from separating and to prevent the sagging of said coil.

9. Means for translating the instantaneous position of a member, which is movable in a predetermined path, into an electrical output signal, the value of which is proportional to said instantaneous position, comprising an elongate electrical resistor disposed in a predetermined extended position, an elongate, magnetically-sensitive member extending generally parallel to said elongate resistor, said member being flexible so that different portions thereof may be selectively brought into contact with said resistor at points therealong which are respectively opposite said different portions;

first permanent magnet means positioned by said member and arranged to be moved thereby in a path which is substantially parallel to the long dimension of said resistor and in magnetic proximity with said flexible member, for selectively causing that portion of said flexible member which is in magnetic proximity therewith to move into contact with said resistor;

and a second permanent magnet means which is separate and distinct from said first permanent magnet means and extends generally parallel to said resistor and is in magnetic proximity with said flexible member substantially throughout its length, said second permanent magnet means having a lesser attraction for said flexible member than said first permanent magnet means when the latter is in its closest proximity to a particular portion of said flexible member, so as to move the latter into contact with said resistor; but said second permanent magnet means being effective to hold those portions of said flexible member which are out of said closest proximity to said first permanent magnet means away from electrical contact with said resistor and to retract all portions of said flexible member away from contact with said resistor which are out of said closest magnetic proximity with said first permanent magnet means.

References Cited in the file of this patent
UNITED STATES PATENTS

| | | |
|---|---|---|
| 1,610,591 | Redman | Dec. 14, 1926 |
| 2,484,690 | De Giers | Oct. 11, 1949 |
| 2,592,929 | Matchett | Apr. 15, 1952 |